United States Patent [19]

Goossen et al.

[11] Patent Number: 6,071,316
[45] Date of Patent: Jun. 6, 2000

[54] AUTOMATED VALIDATION AND VERIFICATION OF COMPUTER SOFTWARE

[75] Inventors: Emray R. Goossen, Albuquerque, N. Mex.; David K. Shema, Cedar Rapids, Iowa; Carl E. Lippitt, Madison, Miss.

[73] Assignee: Honeywell Inc., Minneapolis, Minn.

[21] Appl. No.: 08/939,419

[22] Filed: Sep. 29, 1997

[51] Int. Cl.$^7$ ....................................................... G06F 9/45
[52] U.S. Cl. ..................................................... 717/4; 717/5
[58] Field of Search .................................... 395/701, 702, 395/704, 706, 710, 705; 711/128; 364/491

[56] References Cited

U.S. PATENT DOCUMENTS

| | | | |
|---|---|---|---|
| 4,819,233 | 4/1989 | Delucia et al. | 395/704 |
| 4,831,517 | 5/1989 | Crouse et al. | 395/182.06 |
| 4,853,851 | 8/1989 | Horsch | 364/300 |
| 4,864,569 | 9/1989 | Delucia et al. | 395/183.14 |
| 5,079,731 | 1/1992 | Miller et al. | 364/578 |
| 5,263,162 | 11/1993 | Lundeby | 395/700 |
| 5,432,795 | 7/1995 | Robinson | 395/704 |
| 5,559,718 | 9/1996 | Baisuck et al. | 364/491 |
| 5,652,875 | 7/1997 | Taylor | 395/500 |
| 5,721,863 | 2/1998 | Covino et al. | 711/128 |
| 5,740,441 | 4/1998 | Yellin et al. | 395/704 |
| 5,822,607 | 10/1998 | Henry et al. | 395/800.32 |
| 5,963,739 | 10/1999 | Homeier | 395/704 |

FOREIGN PATENT DOCUMENTS

07034532 A2  3/1996  European Pat. Off. .

OTHER PUBLICATIONS

Young et al, Integrated concurrency analysis in a software development environment:, ACM pp 200–209, Jun. 1989.

Kemmerer, "Completely validated software", ACM pp 359–360, Jul. 1987.

Eggert, "Towards special purpose program verification", ACM pp 25–29, May 1990.

LaMarr & Fravel, "Software independent verification and validation: A process perspective", ACM, pp. 408–417, Jul. 1991.

Kang & Ko, "Parts: A temporal logic based real time software specification and verification method", ICSE, ACM, pp. 169–176, Jan. 1995.

Code Coverage Mapper with Branch Analysis for an Intel 8088 Microprocessor in Maximum Mode, IBM Technical Disclosure Bulletin, Jul. 1986, p. 544, vol. 29, No. 2.

*Primary Examiner*—Tariq R. Hafiz
*Assistant Examiner*—Anil Khatri
*Attorney, Agent, or Firm*—Andrew A. Abeyta; Kenneth J. Johnson

[57] ABSTRACT

A method and apparatus for automating validation and verification of computer software that confirms during a test execution of the software that all lines of code are executed and all branches in the software are taken or not taken at least once. The computer software to be tested is compiled and a link map is generated. After compilation of the code, it is run in a test fixture to test all the required functions. During this test execution, a monitoring process is performed which documents which lines of code have been executed and whether certain branches of the code were either taken or not taken. An execution record is generated which indicates what instruction branches were taken and were not taken. A comparison is then made between the link map originally generated and the instruction record generated to determine what lines of code were executed, whether each branch was taken at least once, and whether a branch was not taken at least once.

10 Claims, 4 Drawing Sheets

AUTOMATED VALIDATION AND VERIFICATION OF COMPUTER SOFTWARE

FIELD OF THE INVENTION

This invention relates to automated validation and verification of computer software.

BACKGROUND OF THE INVENTION

Most modern aircraft utilize digital techniques and software to command control surface positions. The pilot movements of the control instruments, such as the foot pedal or yoke, are translated into electrical signals which are then transmitted to actuators which move the control surfaces. These black boxes which convert movements into electrical signals have software which is critical to the safety of the aircraft.

In order to be sure that these computer systems operate properly on an aircraft, the Federal Aviation Administration (FAA) requires that all software used in a critical system follow a stringent development and testing process. For FAA certification, software is developed and tested according to one of five DO-178 levels: A, B, C, D, or E. Levels D and E require very little analysis and do not require much in order to show compliance. Level C certification is slightly more difficult. At this level of development, software must be traceable to the requirements and test procedures, and the test results must be correlated to the system requirements. This level is mostly concerned with the process of software development.

Level B certification requires that a demonstration of software and implementation be provided such that it can be shown that there is no dead code (unreachable or unexecutable during the test process) in the system. The dead code check is performed from a source code perspective and the test results need to show that each source line of executable code was reached during the test.

Level A certification builds upon level B and places additional requirements on the path coverage testing of the software to be performed in an embedded computer system. Where level B testing only needs to show that every source line was executed and every logic path taken, level A testing must certify that every machine instruction in the object code is executed. In addition, it must be shown that every logic path decision through the software has been exercised exhaustively during the test.

The difference between level B and level A testing is most apparent in the following example using three lines of computer code:

001—IF ((A. and. B). OR (C. and. D))
002—THEN set E to X
003—set E to Y

For level B testing, it is necessary to show two results: 1) that lines 001, 002, and 003 are executed, and 2) that lines 001 and 003 were executed while 002 was not. For level A testing it is necessary to show that each of the possible combinations that would make the conditional of line 001 true or false. Level B testing may be performed on the source code level. Level A must be performed on the machine code level. Since each source line of executable code is translated into one or more machine instructions by the compiler and linker, a run-time tool that could verify that each machine instruction conditional branch did branch at least once, and at least once did not branch would go a long way towards automating the level A certification testing.

Currently, level A testing is performed on aircraft-critical computer software by manually comparing the results of a test run of the computer program which documents each line of code that was executed, with a link map which is generated at the time the source code is compiled. The person analyzing the code must first determine that every line of code was executed, and that each branch was both taken and then not taken. Because of the amount of time it takes an individual or group of individuals to analyze computer code, especially when aircraft systems are becoming more voluminous and sophisticated, it would be a great advantage to automate this process.

The object of the present invention is to provide a system which automates level A testing of critical software.

SUMMARY OF THE INVENTION

The present invention discloses a method and apparatus for automatic validation and verification of computer software. The software to be tested is first retrieved from a software library and compiled from source code into object code. A link map is generated which identifies and locates all the lines of code in the software program. The object code is then embedded in the computer electronics. The computer functionality is tested by means of a test fixture modeling all the interface requirements. During the testing of the computer functionality, the execution of the object code is monitored. The main function of this monitoring is to provide two separate instruction address maps which provide a history of the lines of object code which have been executed. The first map contains all instruction addresses for the software program where the software code did not branch off but instead executed lines of code with consecutive addresses. A second address map contains all instruction addresses for lines of code for which a branch is taken.

Once the first and second maps are generated, they are then compared with the link map to determine if every line of code in the program was executed. For level A testing, a determination is then made as to whether every branch in the program was taken at least once and then not taken at least once. These results are then provided in a report which is output from the system. The decision path logic is covered naturally through the functional testing used to exercise the embedded software.

DESCRIPTION OF THE PREFERRED EMBODIMENTS

Figure 1:
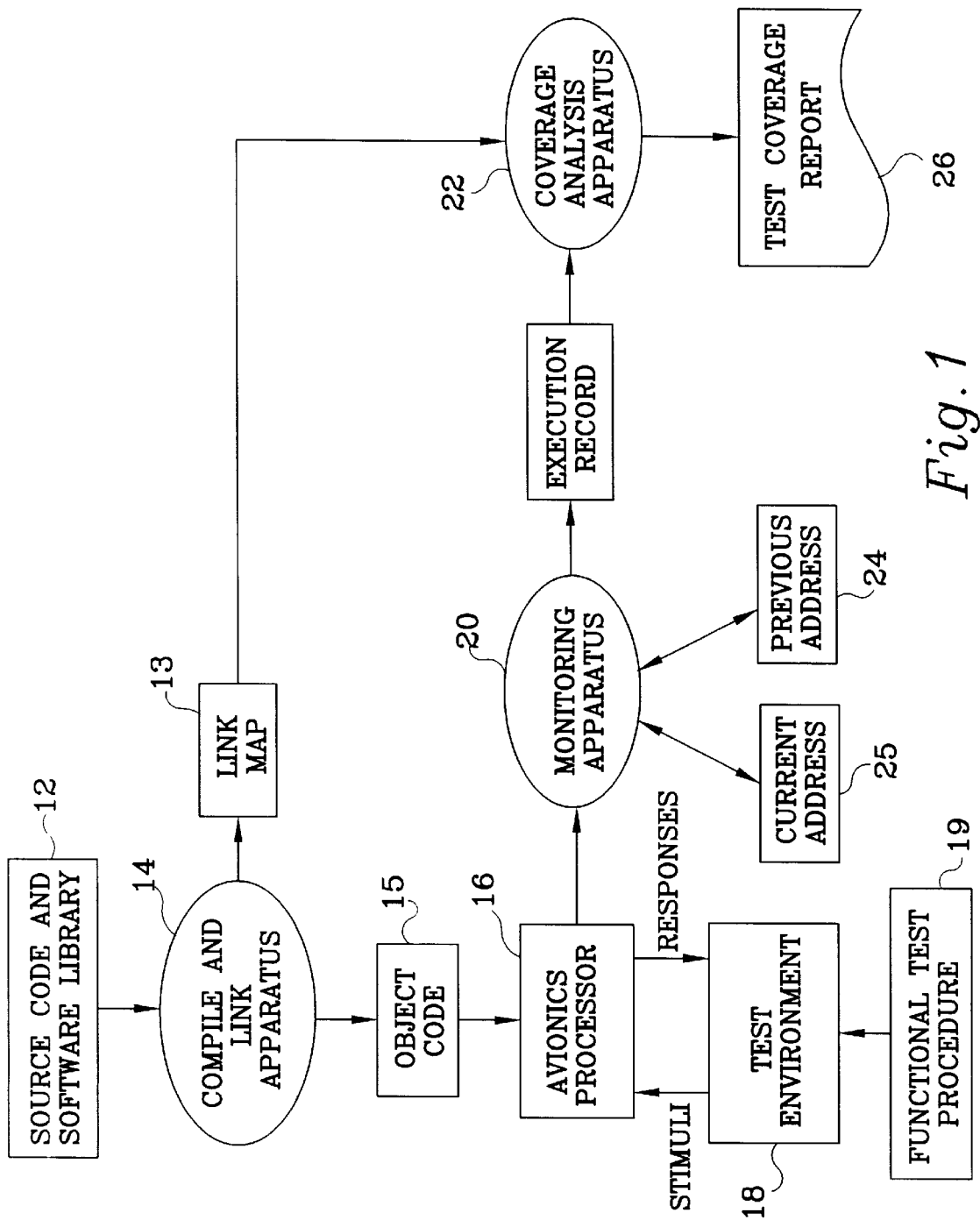
FIG. 1 discloses a block diagram of the automated validation and verification of computer software system.

Disclosed in FIG. 1 is a block diagram showing the system configuration for the automated validation and verification of software apparatus. Software which is to be tested is initially stored in source code and software library 12. The source code to be tested is retrieved from source code and software library 12 by the compile and link apparatus 14. The compile and link apparatus 14 is a software language computer that generates machine code targeted to the specific avionics processor 16. Its input from the source code and software library 12 is either assembly code or a higher order language. This apparatus compiles the source code and outputs object code 15 to the avionics processor 16 while also generating a link map 13 which provides a listing of all of the lines of code in the software as well as all the links for all loops which are part of the software.

The avionics processor 16 is the black box which is installed in an aircraft and detects the pilots' movements on the control sticks and instruments and translates these movements into electrical signals which are then provided to electronic actuators which move the control surfaces. The avionics processor 16 is the hardware into which the executable program in loaded. It provides the interfaces into the physical environment. The use of the avionics processor in the description is merely the preferred embodiment; however, one skilled in the art would realize that any type of electronics which employ computer software can be tested in the present system.

Once the object code is embedded in the avionics processor 16, a test environment 18 runs the processor through all its intended functions by stimulating the external interfaces of the avionics processor. The test environment 18 provides a model of the physical environment that the avionics processor is intended to control. This environment is manipulated by the functional test procedure 19 to verify the desired control responses. The responses are evaluated by the test environment for compliance with the functional requirements. The purpose of this test is to determine whether the processor can perform all the functions required by the system it is to control.

During the testing of the avionics processor 16, the monitoring apparatus 20 tracks the execution of each line of code, and stores the current address being executed in memory 25 and the previous address of the line of code which was executed in memory 24. The monitoring apparatus 20 may be implemented in either a combination of hardware and software elements or hardware only. It must be able to perform its functions at the speed of the avionics processor. The monitoring apparatus 20 then generates an execution record consisting of two separate fields associated with the execution of the object code in the avionics processor. One field is a branch taken indicator and the other is a branch not taken indicator field. The branch taken field contains the true state "1" for lines of code where a branch was taken when executing a decision instruction. The branch not taken field contains the true state "1" for the lines of code that were executed consecutively according to their addresses. A more detailed description of the operation of the monitoring apparatus is included below.

Both the branch taken field and the branch not taken field are transmitted to the coverage analysis apparatus 22. The analysis apparatus 22 also retrieves the link map originally generated by the compile link apparatus 14 and through a detailed post processing comparison of the branch taken and branch not taken fields, provides a detailed analysis of how the object code was executed in the avionics processor. Speed is not critical, so the comparison process is implemented as a software program. A test coverage report 26 is then output which details the location of dead code as well as other relevant information.

The system disclosed in FIG. 1 provides both level A and level B testing of software as required under Federal Aviation Administration (FAA) regulations. Level B certification requires that a demonstration of the software implementation be provided such that it can be shown that there is no dead code (unreachable, or unexecuted during the test process) in the system. This dead code check is performed from a source code perspective and the test results need to show that each source line of executable code was reached during the test.

Level A certification builds upon level B and puts additional requirements on the paths coverage testing of the software to be performed on the embedded system. While Level B testing only needs to show that every source line was executed and every logic path (branch) taken, level A testing must verify that each machine instruction in the object code is executed. In addition, it must be shown that every logic path decision, through the software has been exercised exhaustively during the test. This means that when executing instructions which require a decision as to whether to continue to the next instruction or go somewhere else in the program, it must be shown that both choices were taken at least once.

Figure 2:
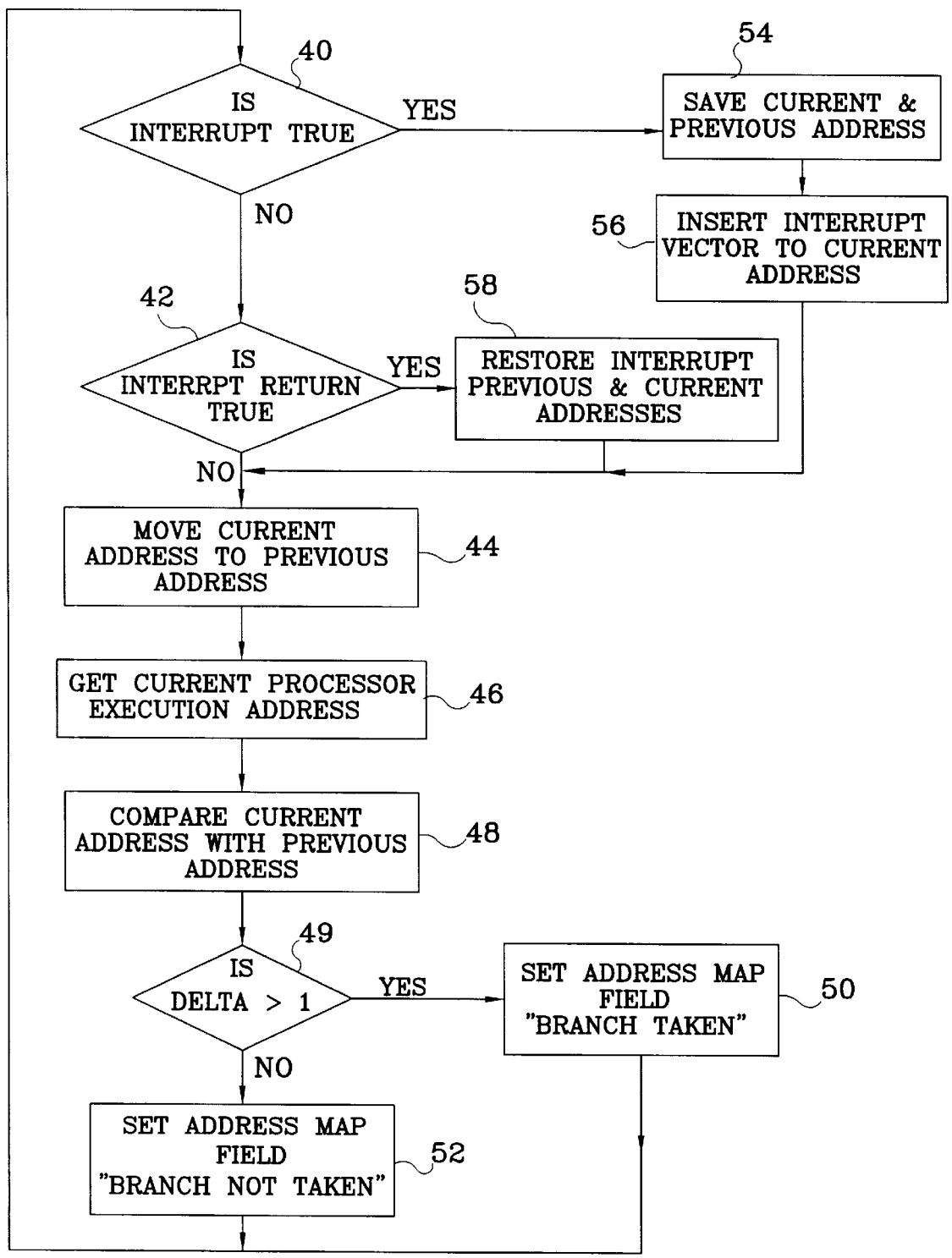
FIG. 2 discloses a flow chart of the monitoring of the software execution.

The flow chart in FIG. 2 describes in detail the operation of the monitoring apparatus 20. In the preferred embodiment of the invention the method described is for a processor with single byte instructions. One skilled in the art will recognize that the process applies to multiple byte instruction processors with modification only of the current versus previous instruction address comparison steps. As discussed above, the monitoring apparatus generates the execution record with branch taken and branch not taken fields which are transmitted to the coverage analysis apparatus 22.

Avionics processor 16 supports the ability to vector the execution of the program being tested to a remote address through an interrupt branch. There may be several vector addresses and they can be triggered by internal or external events. Validation of these interrupt branches and their returns is described below. At step 40 an inquiry is periodically made as to whether such an interrupt signal has been received. If not, at step 42 a determination is made as to whether a return from interrupt has occurred. If both responses to blocks 40 and 42 are no, monitoring apparatus 20 continues its normal verification and validation of the software.

As was described above, while the object code is being executed in the avionics processor 16, the monitoring apparatus 20 receives the address of each line of code that is executed. As each address is executed, the content of the current address memory 25 is moved into the previous address memory 24, and then the current address is stored into the current address memory. This portion of the process is described in steps 44 and 46 respectively.

In order to determine whether a branch was taken or not taken during execution of the object code, a comparison of addresses is made at step 48. After the comparison, a determination is made at step 49 as to whether the current address is more than one greater or less than the previous address. An answer of yes indicates that the address instructions are not being executed consecutively and that the previous address was a decision instruction and the decision was resolved such that a branch remote from the decision instruction is executed. At step 50, the branch taken field is set to true for the previous address.

If the current address is not more than one or less than the previous address, then it is clear that a branch has not been taken and instructions were executed consecutively. At step 52, the branch not taken field is set to true for the previous address.

If at step 40 an interrupt has occurred, the current and previous addresses are stored at step 54 for recall upon return at step 58 from the interrupt. The new current address vector is loaded into the current memory field at step 56 such that monitoring of the interrupt process can be accomplished by steps 40 through 52.

Once the interrupts are complete, the entire process continues until the test of the avionics processor is done. At this point the branch taken and branch not taken maps which make up the execution record map are transmitted to the coverage analysis apparatus 22.

Figure 4:
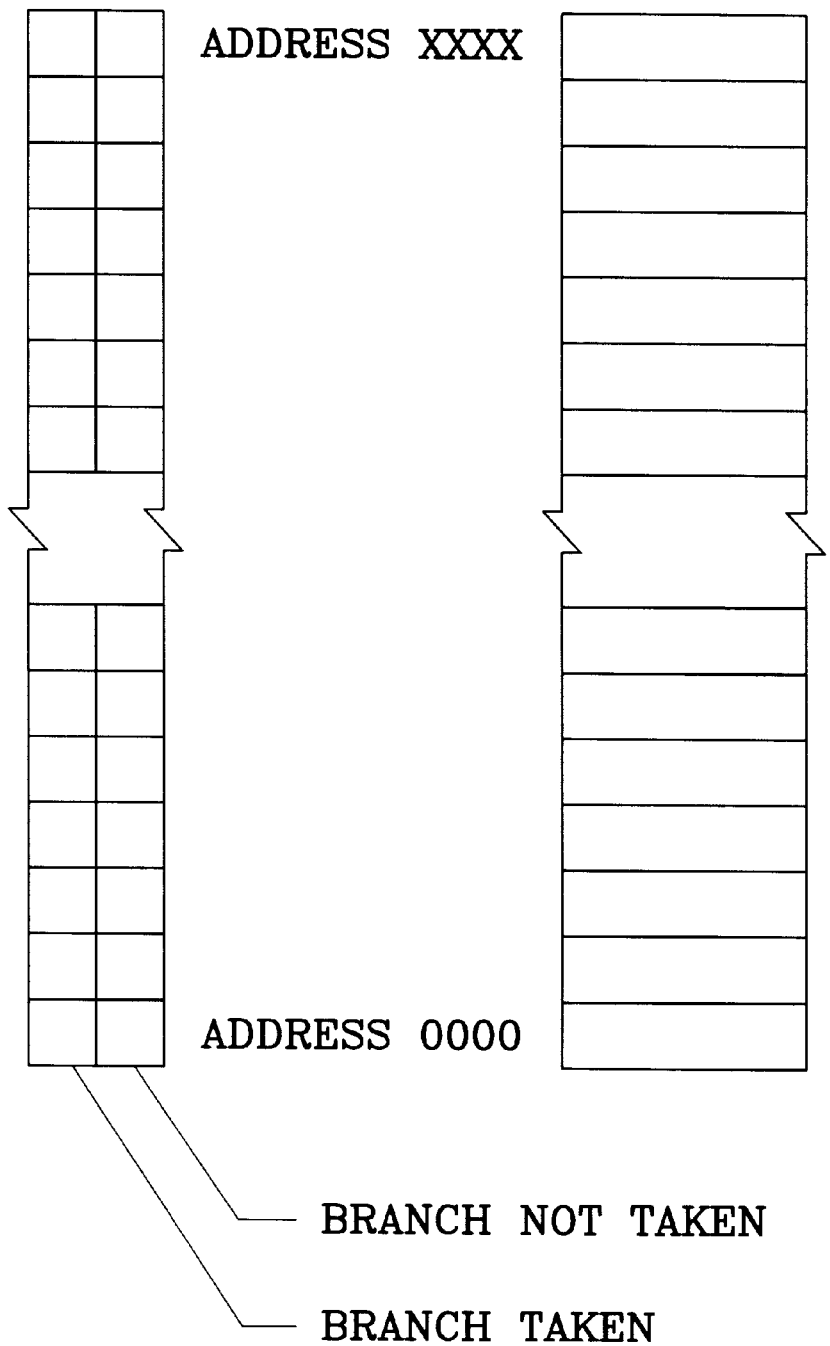
FIG. 4 discloses the execution record map created by the monitoring apparatus which is compared to the link map by the coverage analysis apparatus.

FIG. 4 discloses the structure of the execution record map and the link map. The link map 92 can be structured in two ways: 1) It can contain the processor machine code, or 2) it can contain the mnemonic representing the instruction. The contents provide the coverage analysis apparatus 22 with the potential execution paths that the avionics processor 16 can take. The execution record map is a simple two field record table associated with each instruction memory location. The data in the branch not taken and the branch taken fields represents a true or false condition which is evaluated by the monitoring apparatus 20.

Figure 3:
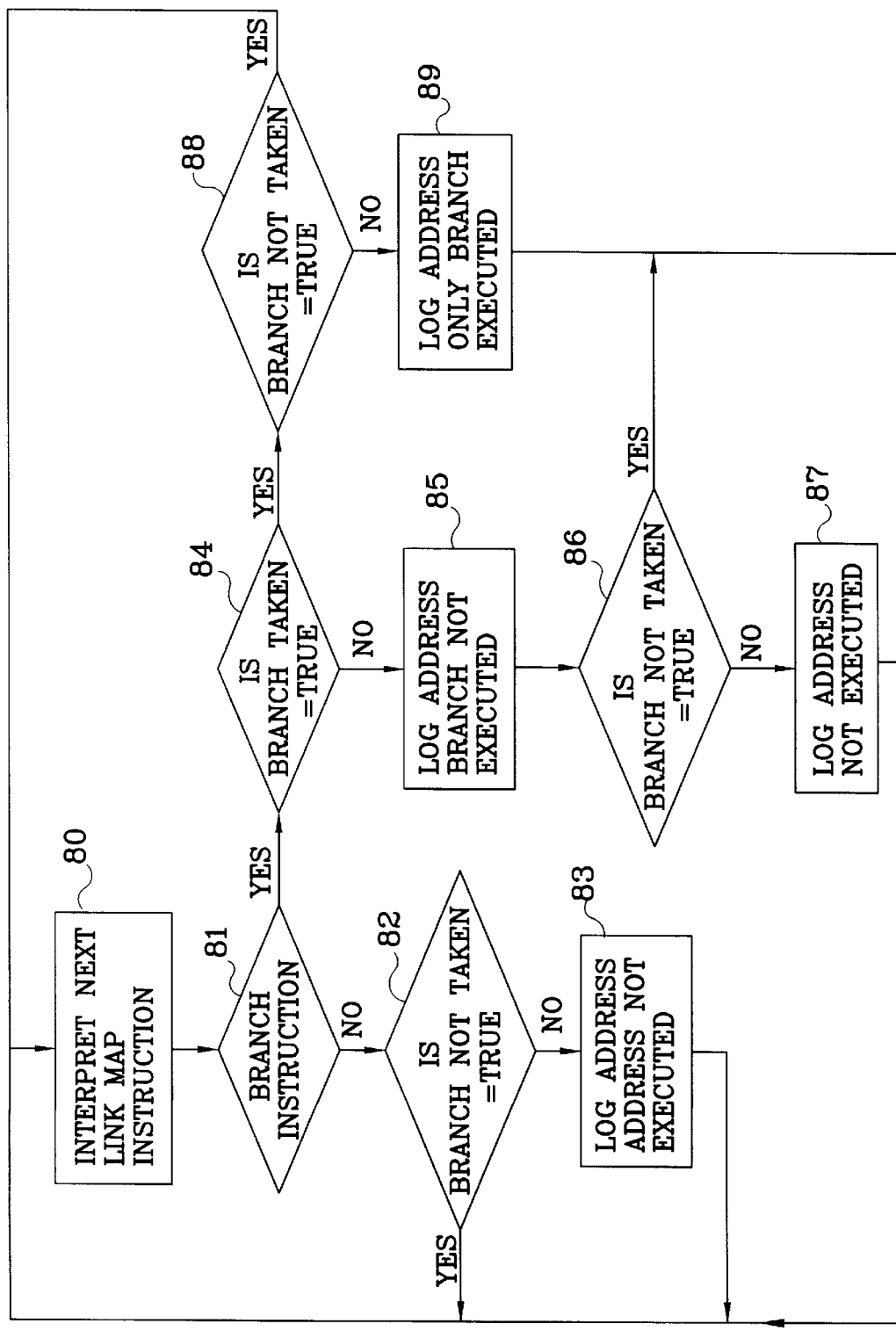
FIG. 3 discloses a flow chart of the comparison of the branch taken and branch not taken address maps with the link map.

FIG. 3 discloses a flow chart which describes the operation of the coverage analysis apparatus 22. The coverage analysis apparatus performs a post processing of the execution record map by comparing its contents against the link map which was generated by the compile and link apparatus 14. Beginning at address 0000, the first instruction in the link map is interpreted at step 80. A query is then made at step 81 as to whether this line of code is a branch instruction. If it is not a branch instruction, at step 82 the execution record map branch not taken field is examined for this address. If the instruction is found (yes), then the instruction was executed during the test, and the coverage analysis process returns to step 80 and the next address in the link map is read. If the instruction is not found at step 82, this indicates that the instruction was not executed which means that either dead code exists in the software, or there is a deficiency in the test. At step 83 the fault is logged into the test coverage report 26 and the process returns to step 80 and the next address in the link map is read.

If at step 81 it is determined that the line of code is a branch taken instruction, then both of the execution record fields (branch taken, and branch not taken) must be examined. At step 84 a query is made as to whether the branch was taken. With all branch instructions this must happen once. If the answer is yes at step 84, another query is made at step 88 as to whether the branch was not taken. This must also happen at least once for all branch instructions. If the answer is yes at step 88 the process returns to step 80 and the next address in the link map is read.

If at step 84 the answer is no, this means the branch instruction did not cause a branch to be taken. This indicates that there is a fault in the code and the address of the branch instruction is logged at step 85. The instruction is further analyzed at step 86 to determine if the branch not taken field is set to true. If the answer is no, there is a fault in the code and the address of the instruction is logged in the test coverage report at step 87. The process then returns to step 80 and the next address in the link map is read. If the answer is yes at step 86, it means that the branch was not taken at least once at that point. The process then returns to step 80 and the next address in the link map is read.

If at step 88, the branch taken field was true but the branch not taken field is false, then the stimulus provided by the test only provided the conditions to cause a branch and the inline code was not executed. A fault indicating that only the branch was executed is logged at step 89 into the test coverage report for this address. The process then returns to step 80 and the next address in the link map is read.

The coverage analysis is run for the entire link map. Once every address in the link map has been generated the test coverage report 26 is generated. This report will provide a detailed analysis of the software as it was run in the test environment to determine if any dead code exists and whether all branch instructions were properly executed.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for automated validation and verification of computer software executing path and decision path, the computer software being validated and verified being the same computer software as used after validation and verification without being instrumented with other software, comprising the steps of:

compiling the computer software and generating a link map which includes a listing of all of lines of code in the computer software as well as links for all branches which are part of the computer software;

executing the computer software in a processor such that all functions of the computer software are executed;

monitoring the execution of the computer software in the processor of all lines of code in the computer software, storing a current address of a current line of the computer software which is being executed in the processor and a previous address of a previous line of the computer software being executed in the processor, and generating an execution record map with first and second fields, where the first field contains an indicator of all instruction addresses in the computer software where a branch is not taken, and the second field contains an indicator of all the instruction addresses in the software program where a branch is taken;

comparing the link map with the execution record map to determine that all lines of the computer software are executed, and to identify particular lines and branches of the computer software which were not executed; and generating test coverage report which lists all the lines and branches of the computer software which were not executed and provides an evaluation of the test coverage of potential execution paths and decision execution paths;

wherein the executing and monitoring steps comprise the step of comparing the current address of a current line of the computer software which is being executed with the previous address of a previous line of the computer software that was executed, and if the current instruction is more than one address greater or less than the previous address, the branch taken field is filled with the indicator, and if the current address is no more than one greater from the previous address, the branch not taken field is filled with the indicator; and wherein the step of comparing the link map with execution record map includes determining whether each of the addresses in the link map is or is not a branch instruction, and if it is, determining that the branch instruction has both the branch taken and the branch not taken indicators, and if the address is not a branch instruction determining the execution record map contains the branch not taken indicator.

2. An apparatus for automatic validation and verification of computer software execution path and decision path, the computer software being the same computer software as used after validation and verification without being instrumented with other software, the apparatus comprising:

means to compile the computer software;

means to generate a link map for the computer software which includes a listing of all of lines of code in the computer software as well as links for all branches which are part of the computer software;

means to execute the compiled computer software so that all functions of the computer software program are executed;

means to monitor the execution of the object code executing within the means to execute, and to store a current address of a current line of the computer software and a previous address of a previous line of the computer software, and to generate an execution record map with first and second fields, where the first field contains an indicator of all instruction addresses for execution of the computer software where a branch is not taken, and the second field contains an indicator of all the instruction addresses for execution of the computer software where a branch is taken;

means to compare the link map with the first and second fields of the execution record map to determine whether all lines of code in the software code have been executed, and whether all the branches in the computer software have been taken at least once and not been taken at least once; and means to generate a test report which indicates which of the lines and the branches of the computer software have not been taken.

3. The apparatus for automated validation and verification of computer executing path and decision path software of claim 2 wherein the means to execute the computer software is a test fixture.

4. The apparatus for automated validation and verification of computer software executing path and decision path of claim 2 further including means to account for asynchronous interrupts during execution of the compiled computer software.

5. An apparatus for automatic validation and verification of computer software execution path and decision path comprising:

means to compile the computer software;

means to generate a link map for the computer software which includes a listing of all of lines of code in the computer software as well as links for all branches which are part of the computer software;

means to execute the compiled computer software so that all functions of the computer software are executed;

means to monitor the execution of the object code and to generate an execution record map with first and second fields, where the first field contains an indicator of all instruction addresses for execution of the computer software where a branch is not taken, and the second field contains an indicator of all the instruction addresses for execution of the computer software where a branch is taken;

means to compare the link map with the first and second fields to determine whether all lines of code in the computer software have been executed, and whether all the branches in the computer software have been taken at least once and not been taken at least once; and means to generate a test report which indicates which of the lines and the branches of the computer software have not been taken;

wherein the validation and verification of the computer software execution path and decision path is performed while the computer software is embedded in the means to execute the compiled software.

6. The apparatus of claim 5 wherein the means to execute the compiled software is an avionics processor.

7. The apparatus of claim 2 wherein the validation and verification of the computer software is performed during requirements based testing.

8. The apparatus of claim 2 wherein the validation and verification of the computer software execution path and decision path is performed at the machine code execution level.

9. The apparatus of claim 2 wherein the validation and verification of the computer execution path and decision path is performed at the machine code execution level.

10. The apparatus of claim 2, wherein the means to compare the link map with the first and second fields compares the link map and the first and second fields post-processing to provide an analysis of the method in which the computer software was executed.

* * * * *